United States Patent [19]

Bolhuis

[11] 4,082,985
[45] Apr. 4, 1978

[54] GAS DISCHARGE FLASH LAMP WITH PIEZOELECTRIC TRIGGER GENERATOR

[75] Inventor: Pieter Jan Bolhuis, Eindhoven, Netherlands

[73] Assignee: U.S. Philips Corporation, New York, N.Y.

[21] Appl. No.: 765,527

[22] Filed: Feb. 4, 1977

[30] Foreign Application Priority Data

Feb. 10, 1976 Netherlands .................. 7601312

[51] Int. Cl.² ............... H05B 41/32; G03B 15/03
[52] U.S. Cl. .................. 315/241 P; 315/209 PZ; 354/135; 310/319
[58] Field of Search ............ 315/241 R, 241 P; 354/135; 310/319

[56] References Cited

U.S. PATENT DOCUMENTS

| | | | |
|---|---|---|---|
| 3,712,197 | 1/1973 | Wagner | 354/135 X |
| 3,782,258 | 1/1974 | Boekkooi et al. | 354/135 X |
| 4,025,817 | 5/1977 | Wollschleger | 315/241 P |

*Primary Examiner*—Alfred E. Smith
*Assistant Examiner*—Charles F. Roberts
*Attorney, Agent, or Firm*—Frank R. Trifari

[57] ABSTRACT

An electronic flash unit for igniting a gas discharge flash lamp by means of a piezoelectric element. The unit input terminals are interconnected by a series circuit comprising a rectifier and an undercritically damped parallel LC circuit. The lamp starting electrode is coupled to one main electrode via the inductor (L) and exclusive of the rectifier. The unit produces a lamp ignition signal consisting of a pulse train of alternating polarity which provides more reliable ignition of the flash lamp.

5 Claims, 3 Drawing Figures

GAS DISCHARGE FLASH LAMP WITH PIEZOELECTRIC TRIGGER GENERATOR

The invention relates to a device provided with a gas discharge flash lamp, the lamp having a discharge tube which is provided with two internal main electrodes and an external starting electrode. The device comprises two input terminals which are intended for connection to a mechanically operable piezo-electric element which, when mechanically operated supplies in its electrically unloaded state mainly one starting pulse of a non-changing polarity. For starting the lamp a voltage produced by means of the piezo-electric element is applied — via the input terminals — between the starting electrode and a first main electrode of the lamp, the main electrodes being connected to an electric supply source.

Such a device is, for example, used in combination with a photo camera for taking photographic flashed pictures. Then the piezo-electric element may be disposed in the photo camera or incorporated in an adaptor which is to be fitted on the camera.

U.S. Pat. No. 3,782,258 discloses a known device of the type mentioned. A disadvantage of that known device is that the voltage pulse which is produced by means of the piezo-electric element is sometimes not sufficient for igniting the discharge flash lamp.

It is an object of the invention to provide a reliable ignition of the lamp in a device of the type mentioned in the preamble.

A device according to the invention provided with a gas discharge flash lamp, that lamp having a discharge tube which is provided with two internal main electrodes and an external starting electrode, the device being provided with two input terminals which are intended for connection to a mechanically operable piezo-electric element which, when operated mechanically supplies in its electrical unloaded state mainly one starting pulse of a non-changing polarity, in which for igniting the lamp a voltage which is produced by means of the piezo-electric element is applied — via the input terminals — between the starting electrode and a first main electrode of the lamp, the main electrodes being connected to an electric supply source, is characterized in that the input terminals are interconnected by a series arrangement of a rectifier and a parallel arrangement of an inductive and a capacitive impedance, wherein said parallel arrangement constitutes an undercritically damped circuit, wherein a connection from the starting electrode to the first main electrode of the lamp includes the inductive impedance but is free from the rectifier, and the pass direction of the rectifier has been chosen such that it passes a pulse produced at the input terminal with the same polarity as the starting pulse of the piezo-electric element.

Here an undercritically damped circuit must be understood to mean a circuit which, after having been connected to a d.c. voltage source has a current the direction of which reverses as soon as the current is zero.

An advantage of a device according to the invention is that now the gas discharge flash lamp can be ignited in a reliable manner. This must be ascribed to the fact that the electric voltage which the piezo-electric element supplies is now supplied in a more suitable manner to the starting electrode of the lamp, namely in the form of voltage pulses of alternating polarity.

The following should be noted by way of explanation:

In the case of the prior art device in which both the starting electrode and a main electrode of the lamp is connected directly to the output terminals of a piezo-electric element via connections which do not comprise further circuit components the igniting signal between the starting electrode and, the main electrode of the lamp — when the piezo-electric element is mechanically operated — consists mainly of one voltage pulse. Some further voltage pulses may follow this pulse but their amplitude is, as a rule, negligibly small with respect to that of the first voltage pulse. If the lamp does not ignite after the first pulse then no further ignition of the lamp occurs with that igniting signal. In the case of a photographic device the result is an underexposed photographic picture. This is a disadvantage.

It appears that a gas discharge flash lamp has a better starting behaviour if not mainly one voltage pulse of evidently one polarity is applied between the starting electrode and a main electrode of the lamp but a succession of voltage pulses of alternating polarity. This is proved by means of a comparative test in which the amounts of energy supplied by the piezo-electric element is the same in both cases.

It should be noted that the use — with a devide according to the invention — of a mechanically operated piezo-electric element of the above-mentioned type, namely of a type which, when mechanically operated supplies in its electrically unloaded state one starting pulse of unchanging polarity has advantages consisting of only limited mechanical shocks, which are the result of the mechanical operation on the holder of the piezo-electric element which, as a rule is a photo camera. Excessive mechanical shocks during the time the photograph is taken would namely result in motion unsharpness in the picture.

The inventor was confronted with the problem that said piezo-electric element supplies a unipolar voltage pulse and that for a reliable starting of the gas discharge flash lamp a voltage pulse train of alternating polarity is required.

In view of the capacitive character of piezo-electric elements one might imagine that a simple solution for the problem might be the introduction of only an inductive impedance, namely in an electric connection from the starting electrode to the first main electrode of the lamp. It is true that this results in a starting voltage pulse train of alternating polarity but the electric oscillation in the circuit formed by the piezo-element and the inductance, which generate these starting voltage pulses, is so highly damped by that piezo-element that the amplitude of these voltage pulses is too low for the object aimed at.

The invention is based on the recognition that it would be advantageous to limit the electric oscillation to a part of the circuit of which the piezo-electric element forms no part. In a device according to the invention this exclusion of the piezo-electric element is effected by the blocking action of the rectifier. On the other hand the pulse which is derived from the piezo-element is passed by the rectifier and pulses the undercritically damped circuit which then produces the required voltage pulses of alternating polarity between the starting electrode and the main electrode of the lamp.

The capacitive impedance may also be constituted by a separate (first) capacitor. It is also possible to realise a capacitive impedance in the form of a capacitance between those conductive sections which are located between the rectifier and the lamp electrodes. They may inter alia also be conductive winding sections of an electric coil whose self-induction forms the inductive impedance of the undercritically damped circuit. It would be better to call this type of capacitance which in other circuits are sometimes called parasitic capacitance "assisting capacitance" here.

Furthermore, a preferred embodiment of a device according to the invention comprises an auxiliary capacitor which constitutes a shunt of the series arrangement of the rectifier and the parallel connection of the inductive and the capacitive impedance.

An advantage of this preferred embodiment is that the form of the pulse to be passed by the rectifier can be matched to a certain extent so that the amplitude of the oscillation in the undercritically damped circuit — and consequently the starting signal between the starting electrode and the first main electrode of the lamp — can be made optimum.

Then the rectifier may, for example, be located in a direct connection which does not comprise other circuit components from the first main electrode of the lamp to an input terminal of the device.

In a further preferred embodiment of a device according to the invention the rectifier is located in a conductor which does not comprise further circuit components and which extends from one of the input terminals to the starting electrode, and that the connection from the other input terminal to the first main electrode is completely free from further circuit components.

An advantage of this preferred embodiment is that the first main electrode of the lamp and an input of the piezo-electric element can be connected to the chassis of the device which makes it possible to avoid unwanted voltages.

Preferably the value of the inductive impedance is between 10 and 100 mHenry and that of the capacitive impedance between 5 and 20 pFarad.

An advantage thereof is that a very satisfactory starting signal can be obtained with these relatively low-value circuit components.

A further improvement is possible by using an auxiliary capacitor having a capacitance of 40 - 100 pFarad.

An embodiment according to the invention will be further explained with reference to a drawing in which.

Figure 1:
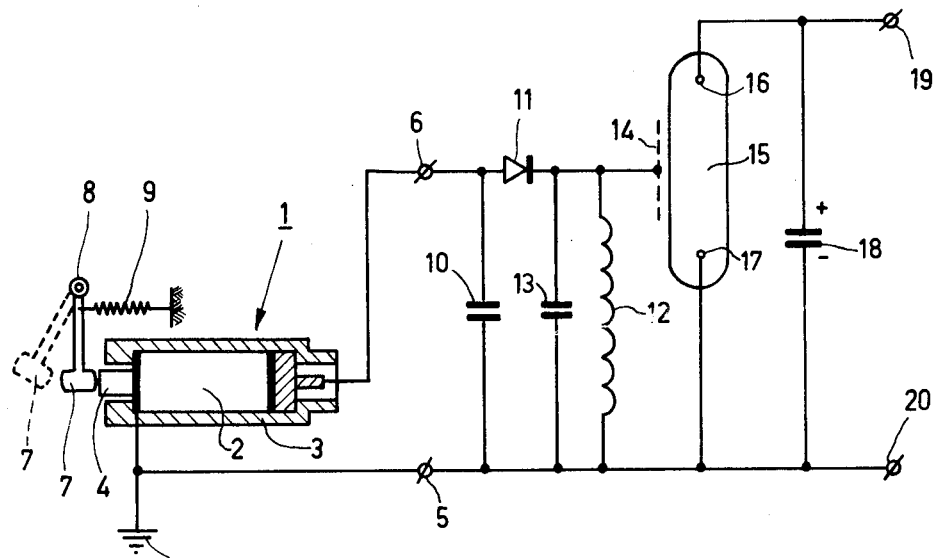
FIG. 1 shows a device according to the invention as well as a piezo-electric element to which the device is connected.

In FIG. 1 reference 1 is a piezo-electric element which is provided with a piezo-crystal 2 which is enclosed in a casing 3. Reference 4 represents an anvil. The side of the piezo-crystal which faces the anvil 4 is connected to an input terminal 5 of the device according to the invention. This terminal 5 is connected to the chassis M of the device. The other side of the piezo-crystal 2 is connected to an input terminal 6 of the device according to the invention. Reference 7 represents a hammer of an actuator of the piezo-electric element. This hammer is capable of rotating around a spindle 8. Reference 9 indicates a tension spring. The hammer 7 is shown in two positions. The dotted figure indicates the pre-tensioned state of the hammer. Furthermore, solid lines show the situation in which the hammer 7 engages the anvil 4.

The input terminal 6 is connected to the input terminal 5 by means of an auxiliary capacitor 10. At the same time the input terminal 6 is connected via a series arrangement of a rectifier 11 and a parallel circuit of an inductive impedance 12 and a capacitive impedance 13 to the input terminal 5. The side of the inductive impedance 12 which faces the rectifier 11 is connected to an external starting electrode 14 of a gas discharge flash lamp 15. The lamp 15 is a discharge lamp which is filled with xenon gas. It also comprises two internal main electrodes indicated by 16 and 17. The main electrode 16 is connected to one of the electrodes of the capacitor 18 whereas the other main electrode 17 is connected to the other electrode of this capacitor 18. Furthermore these capacitor electrodes are also connected to a second set of terminals 19 and 20.

The part of the device which is shown in FIG. 1 and which indicates the piezo-element 1 and its mechanical actuator as well as the supply leads thereto is, for example, located in a photo camera. That part of the device of FIG. 1 which is provided with the reference numerals 5 and 6, as well as the numerals 10 and upwards, is part of an electronic flash device. For starting the flash lamp 15 the input terminals 5 and 6 are connected to the piezo-electric element 1 as shown in FIG. 1.

Figure 2:
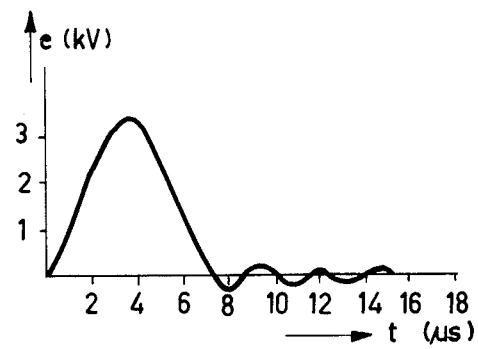
FIG. 2 is a graph of the voltage $e$, plotted as a function of the time $I$, which the piezo-electric element of FIG. 1 produces when it is mechanically operated in its electric unloaded condition.

The device of FIG. 1 operates as follows. First the capacitor 18 is charged via an auxiliary device, not shown, through the terminals 19 and 20 with a polarity as shown in FIG. 1 by means of a plus and a minus sign. Thereafter the hammer 7 of the mechanical actuator of the piezo-element 1, which hammer was originally in the position shown by the dotted lines, is released by means of a trigger device, not shown, which causes this hammer to hit the anvil 4 namely by the action of the tension spring 9. In the photo camera release of the hammer 7 occurs simultaneously with the command for taking a picture. Namely then both the shutter of the camera and the hammer are released. The blow which the hammer 7 deals the anvil 4 is passed on to the piezo-crystal 2 which consequently is slightly compressed. The resulting electric pulse would, if no further load were connected to the input terminals 5 and 6, have a voltage variation as shown in FIG. 2. That is to say that in this case there would mainly be one starting pulse with a non-changing polarity. The fact that this pulse is only followed by some negligibly small vibrations but not by approximately equal pulses in the reverse direction is due to the fact that the piezo-crystal 2 is enclosed in its casing 3. All this eliminates unwanted mechanical shocks during the further course of the photographic picture taking.

Figure 3:
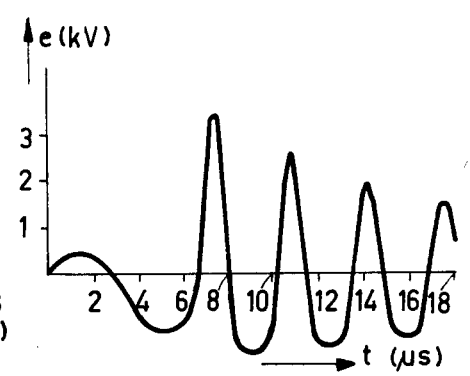
FIG. 3 is also a voltage-versus-time graph of the voltage $e$, plotted as a function of the time $t$, between a starting and a main electrode of a lamp in the device of FIG. 1 on operation of the piezo-electric element.

When a flashed picture is taken a load is now connected to the input terminals 5 and 6 and that in accordance with the circuit shown in FIG. 1. In that case the pulse of the piezo-electric element will therefore originally charge, on the one hand, the capacitor 10 and will produce, on the other hand, a current through the rectifier 11 to the circuit 12, 13. The current pulse through the rectifier 11 excites the undercritically damped oscillator circuit 12, 13 which consequently starts oscillating and produces between the starting electrode 14 and the first main electrode 17 of the lamp 15 an igniting voltage signal which is shown in detail in FIG. 3. This igniting signal consists of pulses of alternating polarity. Then the discharge lamp 15 ignites in a very reliable manner. If the lamp 15 is ignited, current flows through this lamp via the capacitor 18 which causes a flash of light to be radiated to the scene (not shown) to be photographed with the camera.

Experiments have proved that with a device not according to the invention, i.e. one in which the rectifier 11 was a through-connection and in which the circuit components 10, 12 and 13 were not present, the lamp 15 did not always ignite. This was then caused by the fact that in that case mainly approximately the pulse of FIG. 2, that is to say a unipolar voltage pulse, was produced between the electrodes 14 and 17. Introducing only an electric coil in the last-mentioned device between the starting and the main electrode of the lamp indeed produced a starting signal of alternating polarity but the amplitude thereof was less than 60% of that shown in FIG. 3.

With a device according to the invention a more reliable ignition of the lamp is obtained while using an identical piezo-crystal with an identical mechanical actuator.

It is also conceivable that, when using the invention discharge flash lamps would be used which have a higher required starting voltage, which would, for example, have the advantage that these lamps yield more light and/or have a longer life. Moreover, it would be conceivable that with a device according to the invention the voltage to which the capacitor 18 must originally be charged may be less than in the case of the prior art known device.

In a practical embodiment the piezo-crystal 2 had a length of approximately 8 mm and a width of approximately 2.5 mm. The blow the hammer deals corresponds to approximately $2.10^{-2}$ Joules. The capacitor 18 has a capacitance of approximately 300 μFarad and is charged to approximately 350 volts. The capacitor 10 has a capacitance of approximately 80 pFarad. The coil 12 has an inductive impedance of approximately 15 mHenry. The capacitive impedance 13 has a value of approximately 15 pFarad. In some cases the capacitor 13 may be a separate capacitor. In other cases the capacitor may consist, together with the inductive impedance 12, of a coil, the capacitance then being formed by the capacitance between the windings of this coil and/or between the lead wires of this coil. Usually the auxiliary capacitor 10 contributes to a rather small extent towards the form of the igniting signal. Consequently this auxiliary capacitor may sometimes be omitted.

A great advantage of a device according to the invention is that with only a small number of simple small circuit components a reliable ignition of a discharge flash lamp can be obtained. Furthermore, mechanical shocks in the piezo-element and in its holder, which as a rule is a photo camera, are avoided as well as possible.

What is claimed is:

1. A device provided with a gas discharge flash lamp having a discharge tube provided with two internal main electrodes and an external starting electrode, the device comprising two input terminals intended for connection to a mechanically operable piezo-electric element which, when operated mechanically supplies in its electrically unloaded state mainly one starting pulse of a non-changing polarity for igniting the lamp, a voltage produced by means of the piezo-electric element being applied — via the input terminals — between the starting electrode and a first main electrode of the lamp, means connecting the main electrodes to an electric supply source, characterized in that the input terminals are interconnected by a series circuit of a rectifier and a parallel arrangement of an inductive and a capacitive impedance, wherein said parallel arrangement constitutes an undercritically damped circuit, and wherein a connection from the starting electrode to the first main electrode of the lamp comprises the inductive impedance but is free from the rectifier, the pass direction of the rectifier being chosen such that it passes a pulse produced at the input terminals with the same polarity as the starting pulse of the piezo-electric element.

2. A device as claimed in claim 1, characterized in that an auxiliary capacitor is connected in shunt with the series circuit comprising the rectifier and the parallel arrangement of the inductive and the capacitive impedance.

3. A device as claimed in claim 1, characterized in that the rectifier is disposed in a conductor which does not comprise further circuit components and which extends from one of the input terminals to the starting electrode, and that the connection from the other input terminal to the first main electrode is completely free from further circuit components.

4. A device as claimed in claim 1, characterized in that the value of the inductive impedance is between 10 and 100 mHenry and that of the capacitive impedance between 5 and 20 pFarad.

5. A device as claimed in claim 2, characterized in that the capacitance value of the auxiliary capacitor is between 40 and 100 pFarad.

* * * * *